United States Patent
Kleinau et al.

(12)

(10) Patent No.: US 6,448,724 B1
(45) Date of Patent: Sep. 10, 2002

(54) APPARATUS AND METHOD FOR COMMUTATION NOISE REDUCTION

(75) Inventors: Julie Ann Kleinau, Bay City; Steven James Collier-Hallman, Frankenmuth; Dennis B. Skellenger, Vassar, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/658,352

(22) Filed: Sep. 11, 2000

Related U.S. Application Data (60) Provisional application No. 60/162,050, filed on Oct. 28, 1999.

(51) Int. Cl.$^7$ .............................................. H02K 23/00
(52) U.S. Cl. ...................... 318/254; 318/139; 318/432; 318/434; 318/439; 318/599; 318/696; 318/727; 388/801; 388/811
(58) Field of Search ................................ 318/139, 254, 318/232, 434, 439, 599, 696; 388/801, 811

(56) References Cited

U.S. PATENT DOCUMENTS

| | | | | |
|---|---|---|---|---|
| 4,551,708 A | | 11/1985 | Welburn ...................... | 340/347 |
| 5,332,954 A | * | 7/1994 | Lankin ........................ | 318/139 |
| 5,444,622 A | * | 8/1995 | Takeshima et al. .... | 364/424.05 |

(List continued on next page.)

FOREIGN PATENT DOCUMENTS

EP  0 659 629 A2  12/1994 ............ B62D/6/08

OTHER PUBLICATIONS

"Closed Loop Brushless Motor Adapter"; Motorola Semiconductor Technical Data; MC33039; pp. 4–79–4–81.

*Primary Examiner*—Robert E. Nappi
*Assistant Examiner*—Tyrone Smith
(74) *Attorney, Agent, or Firm*—Edmund P. Anderson (57) ABSTRACT

A brushless DC motor modifies motor commutation events to reduce noise by providing overlapping activation of the switch being deactivated with the switch being newly activated so that three switches are temporarily activated. The newly activated switch is pulse width modulated with a motor torque controlling duty cycle, and the switch being deactivated is pulse width modulated synchronously with the newly activated switch but with a duty cycle decreasing from the torque controlling duty cycle. The decreasing modulation of the switch being deactivated allows a slower current decrease in the phase turning off to reduce or eliminate the disturbances, and thus the noise. The decreasing modulation is preferably exponential in manner, with a time constant varying inversely with motor speed so that the duty cycle reaches a predetermined minimum in a predetermined maximum number of motor electrical degrees. The decreasing modulation may be switched on at low motor speeds where its noise reduction is required and switched off at higher motor speeds where the potential for interference with commutation is greater. The decreasing modulation is applicable in a dual switching mode in which each activated switch, except for the switch being deactivated in commutation, is pulse width modulated at the torque controlling duty cycle, or in a modified single switching mode in which the activated switch of one of the upper or lower groups is always closed continuously during its activation, except for commutation, during which the switch remaining on, which alternates between the groups, is closed continuously. Each mode of operation is applied in the motor speed/torque region to which it is best suited.

26 Claims, 7 Drawing Sheets

U.S. PATENT DOCUMENTS

| | | | | |
|---|---|---|---|---|
| 5,742,139 A | * | 4/1998 | Kolomeitsev | 318/254 |
| 5,786,679 A | * | 7/1998 | Nishino et al. | 318/696 |
| 5,793,183 A | | 8/1998 | Carobolante et al. | 318/811 |
| 5,809,438 A | * | 9/1998 | Noro et al. | 701/41 |
| 5,828,192 A | * | 10/1998 | Kawaguchi et al. | 318/139 |
| 6,002,226 A | * | 12/1999 | Collier-Hallman et al. | 318/139 |
| 6,049,181 A | * | 4/2000 | Kolomeitsev | 318/254 |
| 6,056,384 A | * | 5/2000 | Sato et al. | 318/439 |
| 6,104,152 A | * | 8/2000 | Coles et al. | 318/254 |
| 6,122,579 A | * | 9/2000 | Collier-Hallman et al. | 701/41 |
| 6,124,688 A | * | 9/2000 | Coles et al. | 318/254 |
| 6,215,266 B1 | * | 4/2001 | Goh et al. | 318/439 |

OTHER PUBLICATIONS

"A Novel Current Control Strategy In Trapezoidal EMF Actuators To Minimize Torque Ripples Due to Phases Commutations".

J. Cros, et al.; Conference on Power Electronics and Applications vol. 4 Control In Power Electronics; Conference Publication 377.

Unitrode Integrated Circuits "Modelling, Analysis and Compensation of the Current–Mode Converter" U–97, undated.

Unitrode Integrated Circuits "Linear Integrated Circuits—Brushless DC Motor Controller IC" UC1625/UC3625 dated Dec. 5, 1988.

Unitrode Integrated Circuits "New Integrated Circuit Produces Robust, Noise Immune System for Brushless DC Motors", UC115 undated.

Unitrode Integrated Circuits "Brushless DC Motor Controller" UC1625/UC2625/UC3625; SLUS353A dated Nov. 1999.

IEE/EPEA "A Novel Current Control Strategy in Trapezoidal EMF Actuators to Minimize Torque Ripples Due to Phases Commutations" J. Cros, J.M. Vinassa, S. Clenet, S. Astier, M. Lajoie–Mazenc, Sep. 13–16, 1993.

IEEE/KTH "Brushless DC Motor with Low Torque Ripple" by M. Lajoie–Mazenc, J.M. Vinassa, J. Cros, S. Astier, Stockholm Sweden, Jun. 18–22, 1995.

* cited by examiner

APPARATUS AND METHOD FOR COMMUTATION NOISE REDUCTION

CROSS REFERENCE TO RELATED APPLICATIONS

This application claims benefit of U.S. provisional patent application Ser. No. 60/162,050 filed on Oct. 28, 1999, the contents of which are incorporated herein by reference.

This application is also related to U.S. Pat. No. 6,002,226, the contents of which are also incorporated herein by reference thereto.

The present invention is related to brushless DC motors, particularly, motors for use in electric power steering systems.

BACKGROUND OF THE INVENTION

In order to improve the fuel efficiency of an automobile, the power steering pump which continuously circulates a hydraulic fluid, is replaced by an electrical motor that is actuated in response to the manipulation of the steering system.

Accordingly, the vehicles engine is no longer providing a driving force to the power steering pump. This results in a lower overall load upon the engine which will improve fuel efficiency.

An electric motor is used to provide a steering assisting force in response to manipulation of the steering system. One such motor is a brushless DC motor which is mechanically coupled to the steering column in order to provide the assisting force.

Figures 3, 4:
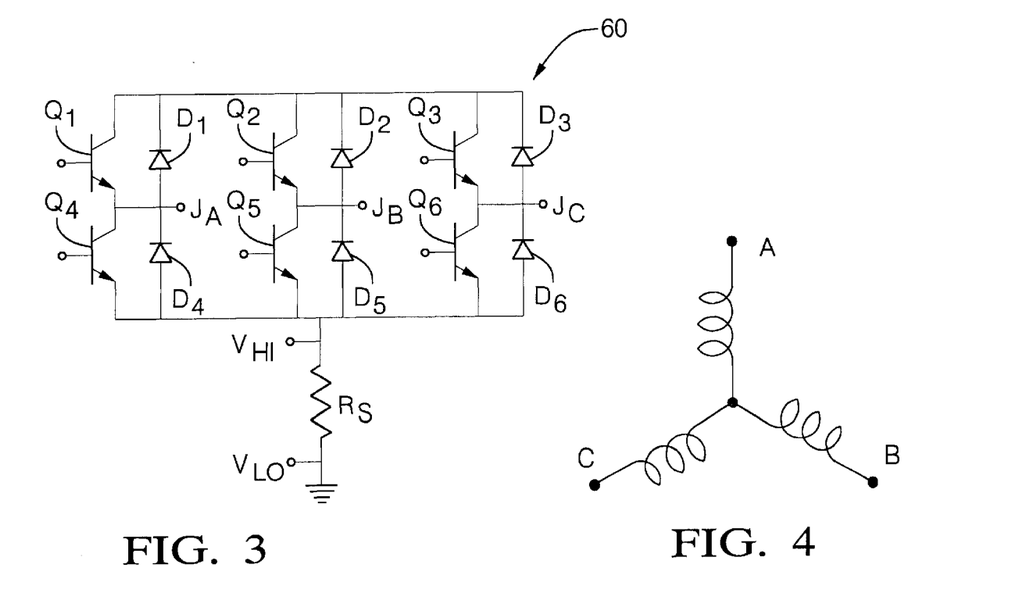
FIG. 3 illustrates a circuit diagram of the bridge circuit for use in the controller of FIG. 2.
FIG. 4 is an equivalent electric circuit of an electric motor for use in the electric power steering system of FIG. 1 with the bridge circuit of FIG. 3.

A brushless DC motor requires electronic commutation of its armature currents. This is typically accomplished, for a trapezoidal back EMF, three-phase motor, by means of a bridge switching circuit containing six semiconductor switches. (FIGS. 3 and 4).

When a predetermined upper switch and non-series lower switch are simultaneously conducting, an armature current flows through two of the three-phase windings, in series, to electromagnetically interact with the permanent magnet motor and develop torque in a predetermined direction.

Commutation to a different pair of armature windings is accomplished by turning off one of the switches and turning on a different non-series switch of the same level (upper or lower). A control provides switching signals to the switch gates in the proper sequence and with the proper timing.

Accordingly, motor operation is controlled by activating the switches in a predetermined pattern.

The electric currents in the activating phases are controlled, usually by a pulse width modulation at a higher frequency, to control motor torque. This modulation, in combination with the inductance of the windings, produces an average motor current, and thus a smooth motor torque. However, this is not the case during commutation.

During commutation, where the phases are turned off and on abruptly, the rise and fall of the phase currents are controlled only by the network properties of the motor and switching circuitry. The forcing function for the phase turning off is not the same as it is for the phase turning on, and one of the circuits (rising or falling) will change faster than the other.

The unequal current in the phase turning off and phase turning on can produce a disturbance in the average motor current, which will cause a variation in torque, at each commutation event. In addition, such disturbances can also drive the motor structure to generate audible noise.

Moreover, and in some applications where the motor structure is positioned within the passenger compartment of a vehicle, the audio level of these noises may reach an objectionable level. In particular, use of such a control and motor in an electric power steering system in modes of operation which produce high phase currents at low motor speed can produce an annoying clicking noise at commutation. This audible noise has been referred to "zipper noise".

Accordingly, it is desirable to control the phase currents of such a motor in order to reduce or eliminate such audible noises.

SUMMARY OF THE INVENTION

The motor control of this invention modifies motor commutation events to reduce noise by providing overlapping activation of the switch being deactivated with the switch been newly activated so that three switches are temporary activated. The newly activated switch is pulse width modulated with a motor torque controlling duty cycle, and the switch being deactivated is pulse width modulated synchronously with the newly activated switch but with a duty cycle decreasing from the torque controlling duty cycle. The decreasing modulation of the switch being deactivated allows a slower current decrease in the phase turning off to reduce or eliminate the disturbances, and thus the noise. The decreasing modulation is preferably exponential in manner, with a time constant varying inversely with motor speed so that the duty cycle reaches a predetermined minimum in a predetermined maximum number a motor electric degrees.

The decreasing modulation may be switched on at low motor speeds where its noise reduction is required and switched off at higher motor speeds where the potential for interference with commutation is greater. The decreasing modulation is applicable in a dual switching mode in which each activated switch, except the switch being deactivated in commutation, is pulse width modulated at the torque controlling duty cycle. The decreasing modulation is alternatively applicable in a modified single switching mode in which the activated switch of one of the upper or lower groups is always closed continuously during its activation, except for commutation, during which the switch remaining on, which alternates between the groups, is closed continuously. The control is preferably responsive to motor current and/or motor speed to apply each switching mode in the motor speed/torque region to which is best suited. Preferably, control stability is improved by a sample/hold circuit and a motor speed controlled variable forcing function generator to augment a sense current feedback signal during the portion of a commutation event in which the early opening of one of the switches causes current to recirculate in the bridge and not be sent by the current sensor.

In yet another embodiment, the time constant is further modified in order to reduce or eliminate disturbances. The further modification of the time constant is dependent upon the input current command.

DESCRIPTION OF THE PREFERRED EMBODIMENT

Figure 1:
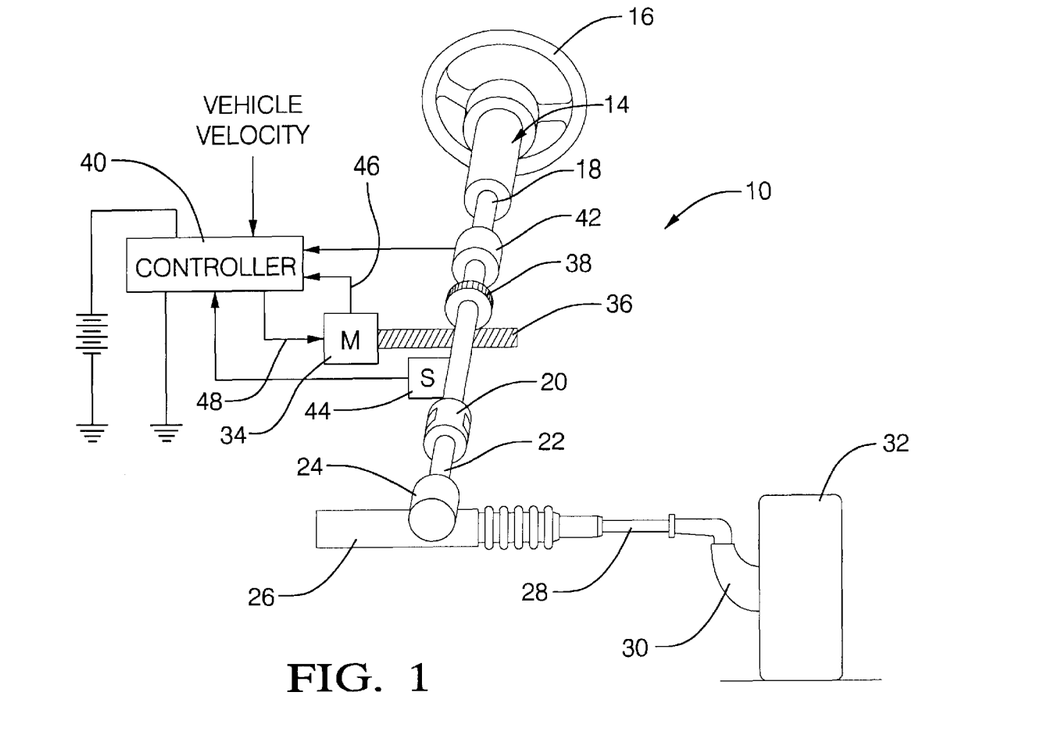
FIG. 1 illustrates a possible configuration of an electrical power steering system.

Referring now to FIG. 1, a steering system 10 for use in a motor vehicle 12 (not shown) is illustrated. Steering system 10 allows the operator of motor vehicle 12 to control the direction of motor vehicle 12 through the manipulation of steering system 10.

A steering column 14 provides mechanical manipulation of the automobiles wheels in order to control the direction of motor vehicle 12. Steering column 14 includes a hand wheel 16. Hand wheel 16 is positioned so that a user can apply a rotational force to steering column 14. An upper steering column shaft 18 is secured to hand wheel 14 at one end and a universal joint 20 at the other. Universal joint 20 couples upper steering column shaft 18 to a lower steering column shaft 22. Lower steering column shaft 22 is secured to universal joint at one end and a gear housing 24 at the other. Gear housing 24 includes a pinion gear (not shown). Pinion gear of gear housing 24 is positioned to make contact with a toothed rack 26.

Tie rods (only one shown) 28 are secured to rack 26 at one end and knuckles 30 (only one shown) at the other.

As a rotational force is applied to steering column 14, through the manipulation of hand wheel 16 or other applied force, the pinion gear of gear housing 24 is accordingly rotated. The movement of the pinion gear causes the movement of toothed rack 26 which in turn manipulates tie rods 28 and knuckles 30 in order to reposition the wheels 32 (only one shown) of motor vehicle 12.

In order to assist the user applied rotational force to steering column 14 an electric motor 34 provides a torque force to a worm 36. Worm 36 is positioned to manipulate a worm gear 38. Worm gear 38 is secured to upper steering column shaft 18. Accordingly, and as a torque force is applied to worm 36, steering column 14 is rotated.

In certain applications electric motor 34 is located within the passenger compartment (not shown) of a vehicle. The positioning of electric motor 34 may be due to a variety of reasons including, but not limited to the following: convenience or easy installation; lack of adequate space within the engine compartment; and hostile environmental conditions within the engine compartment such as, excessive heat, cold, moisture, excessive vibrations and electrical interference.

However, the positioning of electrical motor 34 within the vehicle's passenger compartment increases the need to reduce or eliminate audible noises due to commutation.

Electric motor 34 is actuated by a controller 40 which receives inputs from a torque sensor 42 and a rotational position sensor 44. Sensor 44 provides a steer angle signal to controller 40.

In addition, and as the rotor of motor 34 turns, rotor position signals of each phase are generated within motor 34 and inputted into controller 40 through a bus 46.

Controller 40 also receives an input in the form of a vehicle speed signal. Accordingly, and in response to the following inputs: vehicle velocity input; operator torque input (sensor 42); steering pinion gear angle (sensor 44); and rotor position signals (bus 46), controller 40 determines the desired motor phase currents and provides such currents through a bus 48.

Figure 2:
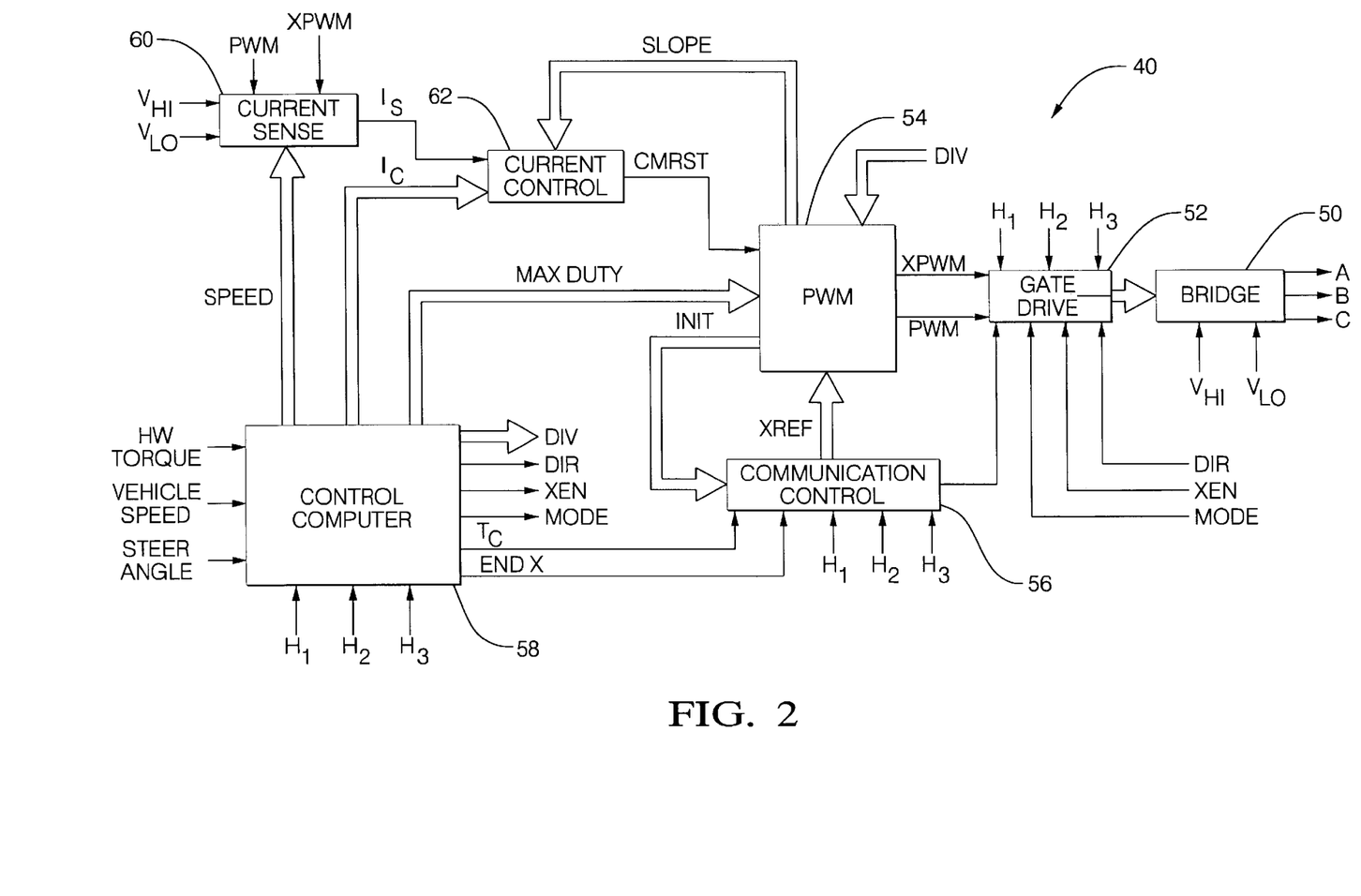
FIG. 2 shows a block diagram of an embodiment of a controller for use in the electrical power steering system of FIG. 1.

Referring now to FIG. 2, a block diagram of controller 40 is illustrated. A standard six-switch bridge circuit 50, (shown in more detail in FIG. 3) switches armature current to the wye connected motor phase windings A, B and C (FIG. 4).

The drive 52 provides the switching signals to control gates of the switches and bridge circuit 50 in response to certain input signals. The drive 52 receives two pulse width modulation voltage signals PWM and XPWM from a PWM circuit 54 (shown in more detail in FIG. 5). The drive 52 also receives commutation initiating signals $H_1$, $H_2$ and $H_3$ from Hall effect rotor position signal generators in motor 34 and a decreasing modulation timing signal XX from a commutation control 56. Gate drive 52 further receives a switching motor control signal MODE, a motor direction control signal DIR and a decreasing modulation enable signal XEN from a control computer 58.

A current sense circuit 60 (shown in more detail in FIG. 6) receives current sense signal voltages $V_{hi}$ and $V_{lo}$ from a current sense resistor Rs in bridge circuit 60 and, with the assistance of a special sample and hold circuit, provides an output motor current signal Is. Current sense circuit 60 also receives signals PWM and XPWM from PWM circuit 54 and a signal SPEED from control computer 58. A current control circuit 62 (shown more detail in FIG. 7), receives the motor current signal Is from current sensor circuit 60, a current command signal Ic from control computer 58 and a signal SLOPE from PWM circuit 54 and provides an output timing signal CMRST to PWM circuit 54. Commutation control circuit 56 provides an output timing signal XREF to PWM circuit 54 in response to an input initial value signal INIT from PWM circuit 54, a time constant signal Tc and a modulation and signal ENDX from control computer 58, and a commutation initiating signals $H_1$, $H_2$ and $H_3$ from motor 34.

Commutation control circuit 56 further provides the signal XX to gate drive circuit 52. Control computer 58 includes a digital computer programs for control of motor 34.

Although not shown, standard oscillator based circuitry provides a basic clock signal CLK for synchronous operation of control computer 58 and the other digital circuitry. Control computer 58 receives the input vehicle speed, handwheel torque, steer angle and motor position ($H_1$, $H_2$ and $H_3$) signals previously mentioned, and derives from these and certain predetermined constants the commanded motor current Ic, as well as the following other output signals: (1) a motor speed signal SPEED; (2) a reference count MAX DUTY for pulse width modulation; (3) a motor direction signal DIR; (4) a commutation mode signal MODE; (5) a decreasing modulation enable signal XEN; (6) a decreasing modulation time constant Tc; (7) a decreasing commutation end reference count ENDX; and (8) a count divider number DIV.

FIG. 3 shows a circuit diagram of a typical bridge circuit comprising six semiconductor switches Q1–Q6 with associated parallel fly-back diodes D1–D6. The switches may be transistors, FET's or similar semiconductor switching devices, and the diodes may be built into the switches in an manner known in the art. Each of switches Q1–Q3, which may be called "upper" switches, is connected in series with one of switches Q4–Q6, which may be called "lower" switches, across a voltage regulated, DC electric power source B+ and a series current sensing resistor R, with the junction of each pair of upper and lower series connected switches connected to a different one of the three motor phase winding terminals in the wye connected motor armature windings. In particular, junction Ja of switches Q1 and Q4 is connected to terminal P of motor phase winding A; junction J of switches Q2 and Q5 is connected to terminal P of motor phase winding B; and junction J of switches Q3 and Q6 is connected to terminal P of motor phase winding C. The diodes, being connected in parallel with the switches, are similarly connected with respect to the motor phase winding terminals.

Current in the motor phase windings is provided by activating an upper switch and a non-series lower switch to close a circuit with the DC electric power source, two phase windings and current sensing resistor R in series. The motor phase windings are electronically commutated to produce motor operation in a predetermined direction of rotation by changing the activated pairs of closed switches in a predetermined pattern well known in the art. Motor currents in the armature phase windings are also controlled by pulse width modulating (PWM) the activated switches at a frequency higher than that of commutation. This PWM switching can be done in several different ways, which results in several different modes of operation of the bridge circuit.

In a first mode of operation, which may be termed dual switching mode, pulse width modulation is provided by switching both the upper and lower activated switches together in the standard manner except during commutation. During commutation, three switches are activated. The newly activated switch on the same level (upper or lower) as the switch being deactivated is pulse width modulated together in the standard manner with the switch on the other level that remains activated; but the switch being deactivated is also pulse width modulated, each pulse of the deactivating switch being initiated synchronously with the others but varying from the others in duration with a controlled, decreased duty cycle.

The preferred manner of decrease in duty cycle of the deactivated switch is exponential, since this tends to produce a linear decrease in current. The newly activated switch is alternated between the upper and lower groups. The pattern shown produces motor rotation in a predetermined direction; the pattern for motor rotation in the opposite direction would be apparent to one of ordinary skill in the art.

Figure 9:
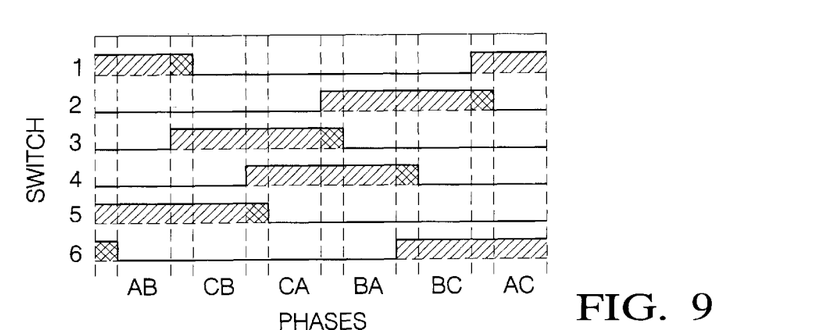
FIG. 9 shows timing diagrams illustrating operation of the controller of FIG. 2 and a first mode.

An example of operation in dual switching mode is described with reference to FIG. 9. The condition of each of switches 1–6 is shown throughout one complete electrical cycle of the motor. For each switch, an activated condition is shown high and an inactivated condition is shown low. While each switch is activated, standard pulse width modulation is shown with single direction cross-hatching and decreasing pulse width modulation is shown with double direction cross-hatching. The non-commutating periods of motor operation (AB, CB, . . . ) are shown separated by unlabeled commutation periods, the duration of latter being exaggerated for clarity. During the non-commutating period AB, upper switch Q1 and lower switch Q5 are activated and pulse width modulated together until commutation. During the following commutation period, upper switch Q3 becomes activated and is pulse width modulated with lower switch Q5; but the pulse width modulation of switch Q1, although continuing with pulses initiated synchronously with the others, is given a decreasing duty cycle. When the decreasing duty cycle of switch Q1 is ended, the switch is deactivated to end the commutation period. The next non-commutating period CB is similar, but with switches Q3 and Q5 pulse width modulated together until the next commutation period, during which Q4, the next switch turning on, is pulse width modulated with switch Q3, the switch remaining on, and Q5, the switch turning off, is pulse width modulated with a decreasing duty cycle. The pattern repeats with appropriate switches activated and modulated as shown in FIG. 9 to complete a cycle through additional non-commutating periods CA, BA, BC and AC and the associated commutation periods.

In a second mode of operation, which may be termed modified single switching mode, pulse width modulation is provided by switching only the upper activated switch, leaving the lower activated switch continuously on, except during commutation. During commutation, three switches are activated: the newly activated switch (upper or lower) is pulse width modulated; the switch remaining activated is turned on continuously, and the switch being deactivated is pulse width modulated with pulses being initiated synchronously with the standard pulses but having a duration varying with a controlled, decreasing duty cycle. The term "modified" in modified switching mode thus refers to the fact that, although during the non-commutating periods the lower switch is always left continuously on, during commutation the switch left continuously on alternates between an upper switch and a lower switch. Thus, operation during commutation is symmetric between the upper and lower switches. This is different from the traditional single switching mode of the prior art, in which the lower activated switch is always left on continuously and modulation is always applied to the upper activated switch.

Figure 10:
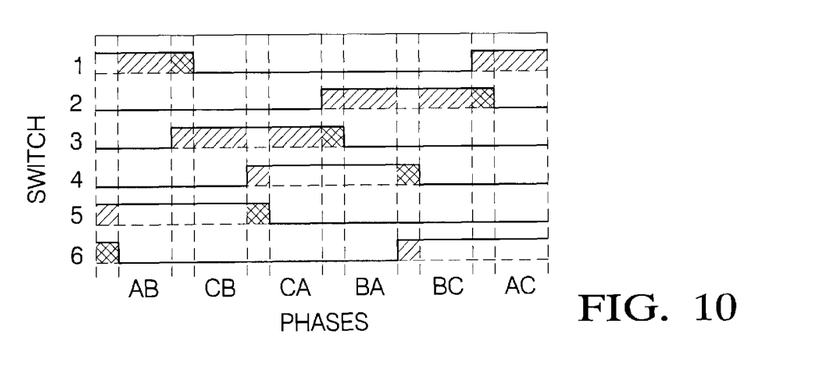
FIG. 10 shows timing diagrams illustrating the operation of the controller of FIG. 2 and a second mode.

An example of operation in modified single switching mode is described with reference to FIG. 10. During the non-commutating period AB, upper switch Q1 and lower switch Q5 are activated, with upper switch Q1 being pulse width modulated and lower switch Q5 continuously on until commutation. During the following commutation period, upper switch Q3 becomes activated and is pulse width modulated, lower switch Q5 remains continuously on and deactivating switch Q1 is pulse width modulated synchronously with a controlled, exponentially decreasing duty cycle. During the next non-commutating period CB, upper switch Q3 is pulse width modulated and lower switch Q5 remains continuously on. During the following commutation period, lower switch Q4 becomes activated and is pulse width modulated during the commutation period, upper switch Q3 is turned on continuously for the commutation period and the deactivating switch Q5 is pulse width modulated synchronously with switch Q4 but with a controlled, exponentially decreasing duty cycle. During the next non-commutating period CA, lower switch Q4 is turned on continuously while upper switch Q3 is pulse width modulated. The pattern repeats with appropriate switches activated and modulated as shown in FIG. 10 to complete a cycle through additional non-commutating periods BA, BC and AC and the associated commutation periods.

The inventors of this apparatus and method have found that a controlled, decreasing modulation of the switch in the phase turning off can effectively control the change in phase currents in the motor during commutation to eliminate the objectionable "zipper" noise. Thus, controller 40 provides a controlled, decreasing pulse width modulation of the switch turning off, beginning synchronously with the first PWM pulse of the switch turning on following a change in one of the rotor position signals $H_1$, $H_2$ and $H_3$. This decreasing modulation is preferably exponential, since such variation tends to produce a linear reduction in current. It begins with the duty cycle in effect at the beginning of commutation and is terminated at a predetermined percent (e.g., 10%) of the maximum duty cycle, since it is not changing much at this level and smaller duty cycles are not easy to maintain in a stable manner. The rate of decrease is also varied inversely with motor speed to maintain a predetermined maximum number of electrical degrees (e.g., 6) duration, so as to ensure that the modulation does not overlap commutation events. In addition, it is preferably turned off at high motor speeds to avoid potential commutation problems. This is permissible, since the "zipper" noise which the decreasing modulation is designed to eliminate is not a problem at high motor speeds (e.g., above 1,000 RPM).

Figure 5:
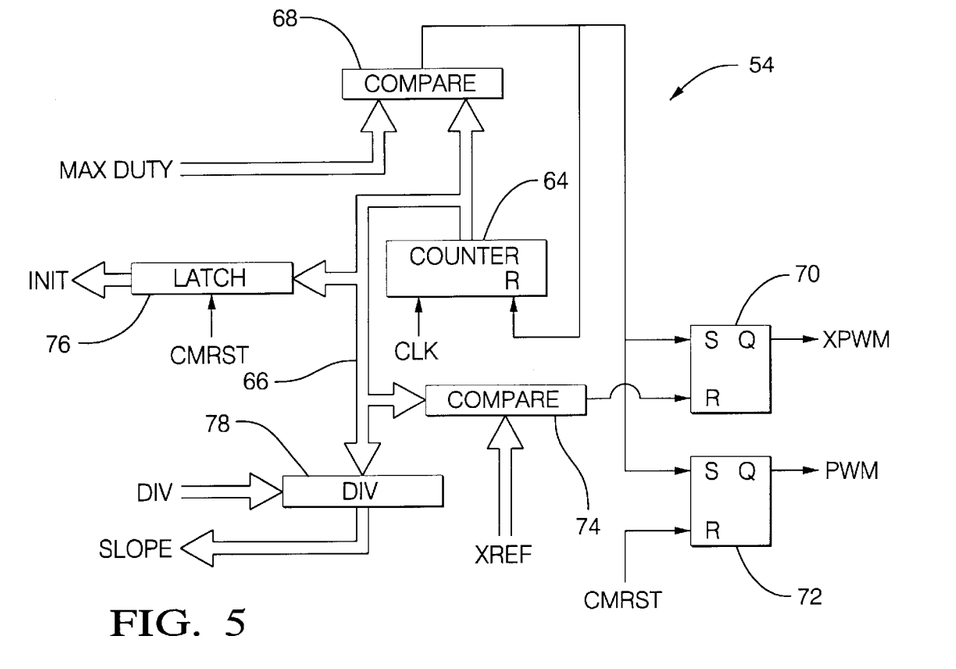
FIG. 5 is a block diagram of a PWM circuit for use in the controller of FIG. 2.

PWM Circuit 54 generates a standard pulse width modulated signal waveform PWM and an exponentially decreasing pulse width modulated signal waveform XPWM, both of which are provided to Gate Drive Circuit 52 to help produce the required switching of semiconductor switches Q1–Q6. As seen in FIG. 5, PWM circuit 54 is based on a counter 64, which counts clock pulses provided in a clock input CLK and outputs each new count on a digital bus 66. A digital comparator 68 receives this count on bus 66 and compares it with a reference count MAX DUTY, provided by control computer 58 and representing the maximum value of PWM (100 percent duty cycle). When the count equals MAX DUTY, comparator 68 outputs a pulse to a reset input R of counter 64 to begin a new count, as well as to the set inputs of flip-flops 70 and 72. Flip-flop 70 provides output signal XPWM, and flip-flop 72 provides output signal PWM; thus, the latter two signals are synchronized at the beginning of each pulse.

The reset input of flip-flop 70 receives the output of a digital comparator 74, which compares the count on bus 66 with an input reference count XREF and generates a pulse when they are equal to cause the end of each pulse in the XPWM signal waveform. The value of XREF is zero, thus providing no XPWM pulses, except during commutation. During commutation it is initialized at a value causing the first pulse of XPWM to have the same duty cycle as that of PWM and then decreases exponentially to cause the duty cycle of XPWM to similarly decrease exponentially.

The reset input of flip-flop 72 could be also provided with a reset pulse from a digital comparator in this circuit. But, for reasons which will become more apparent at a later point in this description, a comparison is performed in analog circuitry in current control 62, which generates a signal CMRST (current mode reset) for application to the reset input of flip-flop 72 to cause the end of each pulse in the PWM signal waveform.

PWM circuit 54 also generates some signals for other circuits in controller 40. The count on bus 66 is latched into a latch 76 by signal CMRST, which latch then contains a digital count INIT which represents the current duty cycle of the PWM signal waveform. The value INIT is provided to commutation control circuit 56 to determine the initial value of the exponentially decreasing modulation, as will be described at a later point in this description. The count is also divided in a divider 78 by an input binary number DIV to produce a divided count SLOPE used for slope compensation.

Signal XREF, which produces the exponentially decreasing modulation in signal waveform XPWM, is generated by commutation control circuit 56, which is described with reference to FIG. 8. Basically, this circuit generates a signal which is initiated at the beginning of commutation with an initial value INIT equal to the present duty cycle of signal PWM and which decreases to a predetermined value at a predetermined rate. Since an exponential decrease is preferred, a low pass filter is used in this embodiment. The exponential delay is preferably controlled to reach a final value corresponding to a predetermined percentage of 100 percent duty cycle in a predetermined maximum safe number of electrical degrees so that it does not interfere with the next commutation event.

Figure 8:
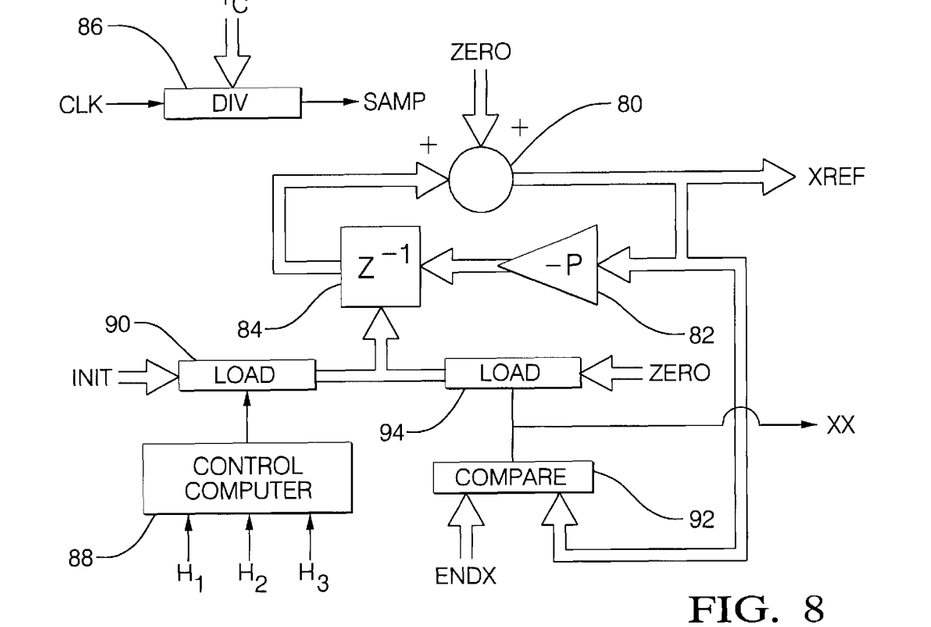
FIG. 8 is a block and schematic diagram of the commutation control circuit for use in the controller of FIG. 2.

Referring to FIG. 8, summer 80, amplifier 82 and delay register 84 are connected in a standard single low pass, digital filter loop with a digital pole P and a time constant controlled by the sample or clock rate. The summer has two inputs: the filter input itself and a delayed and scaled feedback of the output XREF. But delay register 84 can be loaded at any time with an externally supplied digital number, and the filter input to summer 80 is a constant zero. Thus, when a new number is loaded into delay register 84, output XREF will decrease from that number at a predetermined exponential rate. Since the rate of decrease depends both on the gain amplifier 84 (filter pole) and the sampling rate of the filter (time constant), it can be controlled by varying either or both. In this embodiment, the amplifier gain P is constant (e.g., 127/128) and the sampling rate (time constant) is varied by dividing the clock signal CLK in DIV circuit 86 by time constant value Tc, which is provided from control computer 58 as a function of motor speed. The output SAMP of DIV circuit 86 is a divided clock signal used as a clock signal in the filter loop of elements 80–84 in place of signal CLK to control the filter sampling rate.

The filter action is started by loading the value INIT, from PWM circuit 70, into delay register 84; and it is stopped by loading the value zero in delay register 84. Additional circuitry is provided for this purpose. A transition detection circuit 88 receives the commutation initiating signals $H_1$, $H_2$ and $H_3$ from motor 34 and signals the initiation of each commutation event to a load register 90, which loads the value of INIT into delay register 84 in response. The filter thus outputs a value of XREF which is initially equal to INIT and exponentially decreases from that value over time. The output of summer 80 is also provided to one input of a comparator 92 having another input provided with a number ENDX from control computer 58. ENDX is a constant representing a predetermined percentage of the maximum duty cycle MAX DUTY. When XREF falls to the level of ENDX, an output signal from comparator 92 to a load register 94 causes the number zero to be loaded into delay register 84, and XREF goes to zero.

Figure 6:
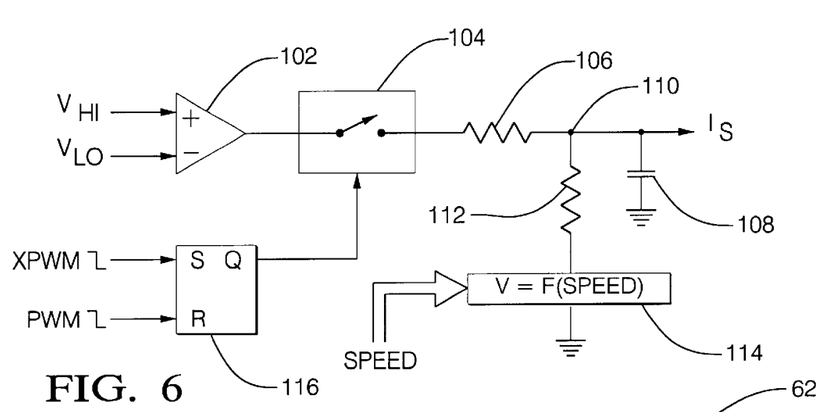
FIG. 6 is a circuit and block diagram of the currents and circuit for use in the controller of FIG. 2.
Figure 7:
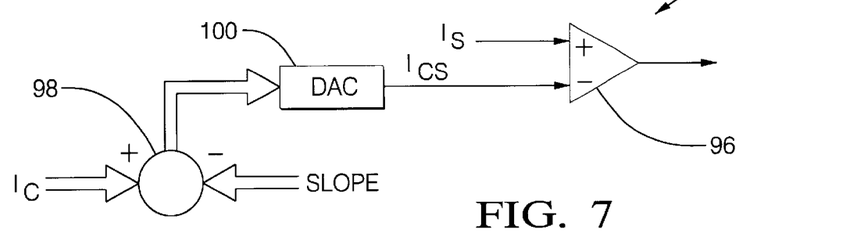
FIG. 7 is a block diagram of the current control circuit for use in the controller of FIG. 2.

Motor current is controlled by current circuit 62, a circuit shown in block diagram form in FIG. 7. An analog comparator 96 generates the current mode reset signal CMRST to end a pulse of signal waveform PWM when the rising sensed current signal Is equals a slope compensated desired current signal Ics. Signal Ics is derived by a digital summer 98, which subtracts the value SLOPE from the value of desired current Ic, and digital-to-analog converter (DAC) 100, which converts the value of Ics to an analog signal. The slope compensation used in this apparatus is an application of a standard technique for the improvement of current loop stability in pulse width modulated, current mode power supplies to reduce potentially noise producing sub-harmonic oscillations in which the reference voltage used to determine the duty cycle is given a compensating downward slope rather than being held constant. In this circuit, the decreasing value of SLOPE, generated in PWM circuit 54, provides the slope compensation. The motor current signal Is is derived in current sense circuit 60, which is shown in FIG. 6. Analog voltage signals Vhi and Vlo from current sense resistor RS in bridge circuit 50 are provided to the inputs of an operational amplifier 102, which provides an output voltage signal of their difference. This difference voltage is proportional to the motor current that flows through resistor R, but it is not responsive to a portion of the motor current which recirculates through the fly-back diodes without flowing through resistor R. This will occur during commutation, for example, when an upper switch remains on while a lower switch is turned off, and vice versa.

The situation may be explained with reference to FIGS. 3 and 11. For example, during a commutation in dual switching mode, upper switch Q1 is being deactivated and upper switch Q3 activated while lower switch Q5 remains activated. Both switches Q1 and Q3 begin the commutation event with the same duty cycle, since this is the initial value Q1's decreasing modulation. Thus, during the initial pulse of the commutation event, all three switches operate at the same PWM duty cycle and all phase currents flow through sense resistor R. But as the duty cycle of switch Q1 decreases during the commutation event, switch Q1 opens before Q3 by increasingly greater periods. When switch Q1 opens with switches Q3 and Q5 closed, the current through phase windings A and B in series, which had been flowing from B+to ground through switches Q1 and Q5, can no longer flow through switch Q1. But the inductance of phase windings A and B will provide a forcing voltage to maintain current flow of phase winding A through switch Q5 and fly-back diode D4. Since this current does not flow through sense resistor R, the sensed current will drop to a lower level than the total motor current actually is.

Figure 11:
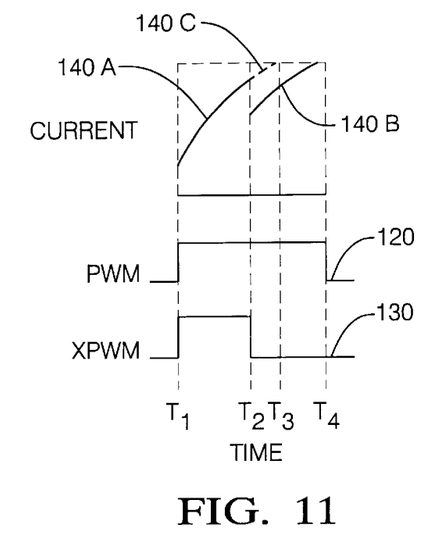
FIG. 11 shows timing and current diagrams useful in the illustration of the operation of the currents and circuit of FIG. 6.

FIG. 11 shows, in solid lines, XPWM pulse 130, the current 140*a*, 140*b* sensed by sense resistor R and the PWM pulse 120 that would result if a signal of this current were output as signal Is. The indicated motor current, represented by line 140*a*, begins at time Ti, and rises until time T2, when switch Q1 opens, and then drops to a lower value, as a portion of the motor current is diverted from current sense resistor Rs, before rising again. Dashed line 140*c* shows the actual current, which would otherwise reach the reference level at time T3. The sensed current, following line 140*b*, does not reach the reference level until time T4. With reliance placed entirely on the current sense resistor, the drop in indicated current would thus delay the current mode reset signal CMRST and thus lengthen the present PWM pulse, as shown by PWM pulse 120. This can lead to sub-harmonic oscillations and noise at fractions (½, ⅓ . . . ) of the PWM switching frequency. Although the PWM switching frequency is out of the audible range, some of the lower, sub-harmonic frequencies are within the audible range, and the noise is audible.

To prevent such noise, current sense circuit 60 includes sample/hold and voltage forcing circuitry. An analog switch on the output of operational amplifier 102 is controlled by signal HOLD to remain closed during the initial rise of each pulse and open when the period of recirculating current begins. Signal HOLD is provided by a flip-flop 116 which has a set input triggered by the falling edge of signal XPWM, which indicates the opening of the deactivating switch, and a reset input triggered by the falling edge of PWM, which indicates current mode reset; and switch 104 responds to signal HOLD to open during the period between these two falling edges.

The output of analog switch 104 is connected through a resistor 106 and capacitor 108 in series to ground; and the junction 110 of the resistor and capacitor is the output of current sense circuit 60. Junction 110 is also connected through a resistor 112 to a controlled voltage source 114, which receives a control signal SPEED from control computer 58. The resistance of resistor 112 is much greater than that of resistor 106; and controlled voltage source 114 is thus effectively isolated from capacitor 108 while analog switch 104 is closed. During the initial current rise, therefore, the voltage on capacitor 108 rises with the output of operational amplifier 102. But when analog switch 104 opens, capacitor 108 becomes isolated from operational amplifier 102 and, rather than drop with the indicated current, continues under control of controlled voltage source 114, which sources current to or sinks current from capacitor 108 depending on the value of its own voltage relative to that on the capacitor. The signal SPEED which sets the voltage of controlled voltage source 114 is derived by control computer 58, for example in a look-up table, from the speed of motor 34. Typically the voltage of controlled voltage source 114 is greater than that on capacitor 108 at the opening of analog switch 102, and the voltage on capacitor 108 continues to rise, providing an estimate of the actual motor current. Thus, referring again to FIG. 11, the actual output Is of current sense circuit 60 after the opening of switch Q1 at time T2 approximately follows dashed line 140*c* and ends the PWM pulse approximately at the correct time T3.

Gate drive circuit 52 has an output connected to the control gate of each of semiconductor switches Q1–Q6 in bridge circuit 50. Each of the outputs of gate drive circuit 52 is provided with one of four possible signals: (1) continuous deactivation (signal low, switch open in this embodiment), (2) continuous activation (signal high, switch closed in this embodiment), (3) sign PWM, or (4) sign XPWM. These signals are directed to the proper outputs at the proper times for desired motor operation in response to a plurality of input control signals comprising (1) commutation initiation signals $H_1$, $H_2$ and $H_3$ from motor 34, (2) MODE, direction (DIR) and decreasing modulation enable (XEN) signals from control computer 58, and (3) signal XX from commutation control circuit 56. The decreasing modulation enable signal (XEN) determines if the operation will use decreasing modulation or if it will be traditional brushless motor control with abrupt switching; and the latter logic and operation are well known in the prior art. The MODE signal determines whether dual switching mode or single switching mode will be used; and, in any case, the direction signal DIR picks the logic for left or right motor operation. It should be noted that, when decreasing modulation is not used, single switching mode is the traditional mode in which the activated switch that is kept closed is always from the same group (usually the lower).

The commutation initiation signals $H_1$, $H_2$ and $H_3$ each have two states, one for each 180 degrees of an electrical cycle for that phase. Thus there are eight possible combinations of these signals, six of which are used to signal commutation events. Preferably, the signal generation is set up so that combinations 1,1,1 and 0,0,0 are reserved for error indication, as known in the art. Each of the other six combinations cause a change to a new set of output signals to the six semiconductor switches, beginning with the next PWM pulse. In dual switching mode, this is all that is required, since it is not necessary to signal the end of commutation. For example, referring to FIG. 9, the combination of signals $H_1$, $H_2$ and $H_3$ indicating the beginning of commutation to phase AB would cause the logic to provide signal PWM to switches Q1 and Q5, signal XPWM to switch Q6 and continuous deactivation (low in this embodiment) to switches Q2, Q3 and Q4 to produce the commutation period. At the end of the commutation period, the only switch that must change is switch Q6, but signal XPWM, already applied to this switch, provides this change itself as it goes low for the remainder of the phase. A similar pattern exists for each of the other five phases in the motor electrical cycle.

In modified single switch mode, however, an additional signal is required to mark the end of commutation. Referring to FIG. 10, at the end of the same commutation event initiating phase AB, switch Q5 must change from the torque controlling PWM waveform to continuous activation (signal high, switch closed) for the remainder of the phase. But signal XPWM itself goes low at this point. In addition, at the end of the same commutation event switch Q1 must change from continuous activation (signal high, switch closed) to the torque controlling PWM waveform for the remainder of the phase. Therefore, in this embodiment, gate drive 52 must itself generate these changes by changing the signal applied to switch Q5 from PWM to continuous activation and changing the signal applied to switch Q1 from continuous activation to PWM in response to a signal of the end of the commutation period. This is similarly true for the other five phases of the motor electrical cycle. The signal of the end of the commutation period might be derived within gate drive 52 from signal XPWM itself, but in this embodiment it is derived in commutation control circuit 56 from the output of comparator 92, which changes state to cause the end of the decreasing modulation. This signal, labeled signal XX herein, is provided to gate drive circuit 52 for this purpose, in this and the other 5 phases of the motor electrical cycle.

The control described above is preferably provided by hardwired logic circuitry in a custom digital chip derived from the information here in any manner known in the art; and such derivation with a straightforward task is well within the capability of one of ordinary skill in the art of design of motor controls.

During the off periods of each pulse width modulation cycle in dual switching mode, the motor current recirculates through the low side and high side fly-back diodes. The decay of inductive current is fairly rapid since the forcing function is large: negative battery voltage plus two diode drops. Due to this rapid decay, a significant amount of slope compensation is required for the current loop stability. In modified single switching mode, however, recirculation of motor current is only through a single fly-back diode; and the forcing function is only a single diode drop. The delay of inductive current is thus much less rapid, and significantly less slope compensation is required. Since the use of decreasing modulation makes the current loop less stable, more slope compensation is required for stability, and the system is less efficient, especially in dual switching mode, since it is already less stable before the decreasing modulation is applied. Therefore, modified single switching mode is the desired operating mood of the apparatus of this invention. In addition the smaller ripple current of this mode generates less electromagnetic interference (EMI). But modified single switching mood has its own problems in some areas of particular concern in an electric power steering system. In modified single switching mode, small currents cannot be attained due to the preloading effects of recirculating currents; but dual switching mode can accurately control low currents. In addition, the torque in motor quadrant II operation, where motor torque is opposed to motor direction, is not constant with motor speed in modified single switching mode but is fairly constant in dual switching mode; and this allows smooth and stable rapid steering reversals.

Figure 12:
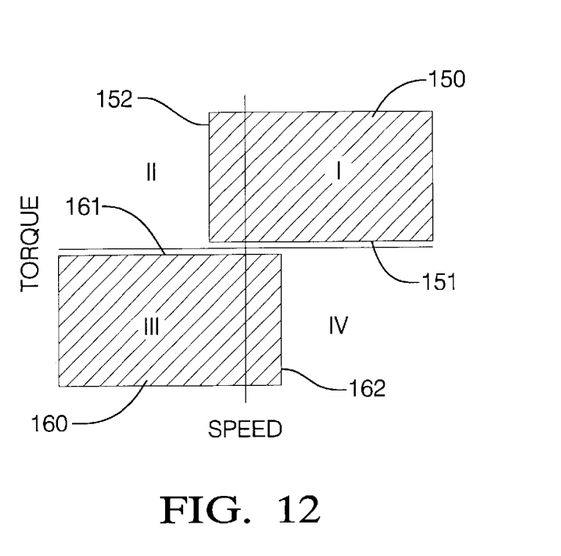
FIG. 12 shows a torque/speed map illustrating areas of application of the first and second circuit modes of the controller of FIG. 2.

Thus, the apparatus of this embodiment uses both modes, each in the area of electric power steering operation in which it provides the greatest advantage. The mode is determined by control computer 58 as a function of the motor operating point, as shown with respect to the motor speed/torque map shown in FIG. 12. Modified single switching mode is used in a region 150 (Cross-enhanced in FIG. 12) to a predetermined positive torque (current) magnitude 151 and to the right of a predetermined negative motor speed magnitude 152 in the upper of the plane comprising quadrants I and II and a correspondingly defined region 160 below a predetermined negative torque (current) magnitude 161 and to the left of a predetermined positive motor speed magnitude 162 in the lower half of the plane comprising quadrants III and IV. Elsewhere, dual switching mood is used. Thus, the more stable modified single switching mode is used throughout quadrants I and III except where low currents are unattainable and also in quadrants II and IV at low motor speeds where steering reversals are acceptable in this mode. Dual switching mode is used where it is needed to attain low currents and using high-speed steering reversals. Control computer 58 may use the desired motor current signal Ic as indicative of motor current or torque and may derive a motor speed signal by determining the time duration between changes in the combination of commutation initiation signals $H_1$, $H_2$ and $H_3$ from motor 34. Such derivation introduces minimum time delay and is thus able to respond to quick changes in motor speed. In addition, the use of time duration, actually an inverse motor speed signal, provides maximum resolution at low motor speed where (zipper) noise is objectionable. In response to the torque and speed values thus derived, control computer 58 compares the operating point of motor 34 to the map shown in FIG. 12, determines the desired mode with hysteresis applied prevent mode cycling, and ends the desired MODE signal to gate drive circuit 52. The comparison may be accomplished in a number of ways, including but not restricted to storing calibrated numbers representing the speed and torque lines 151, 152, 161 and 162 and comparing the derived varying values thereto.

Control computer 58 derives commanded current Ic and motor direction DIR according to any one of many electric power steering controls known in the art from whatever parameters the chosen control requires e.g. vehicle speed, handwheel torque and steer angle. Motor speed may be derived directly from the time between changes in the status of motor position signals $H_1$, $H_2$ and $H_3$. MAX DUTY and ENDX are programmed into control computer 58 as predetermined constants. MODE is determined as described above. DIV, which determines the slope compensation, is determined in a known manner except that separate calibrations are provided for the different modes in response to the MODE signal. The decreasing modulation enable signal XEN is determined at least in response to motor speed to enable at low speed where "zipper" noise is a problem and disable at higher speeds where it might interfere with commutation. The time constant Tc of decreasing modulation is derived as a function of motor speed to provide a modulation decrease in which is essentially constant in terms of electrical degrees.

Figure 13:
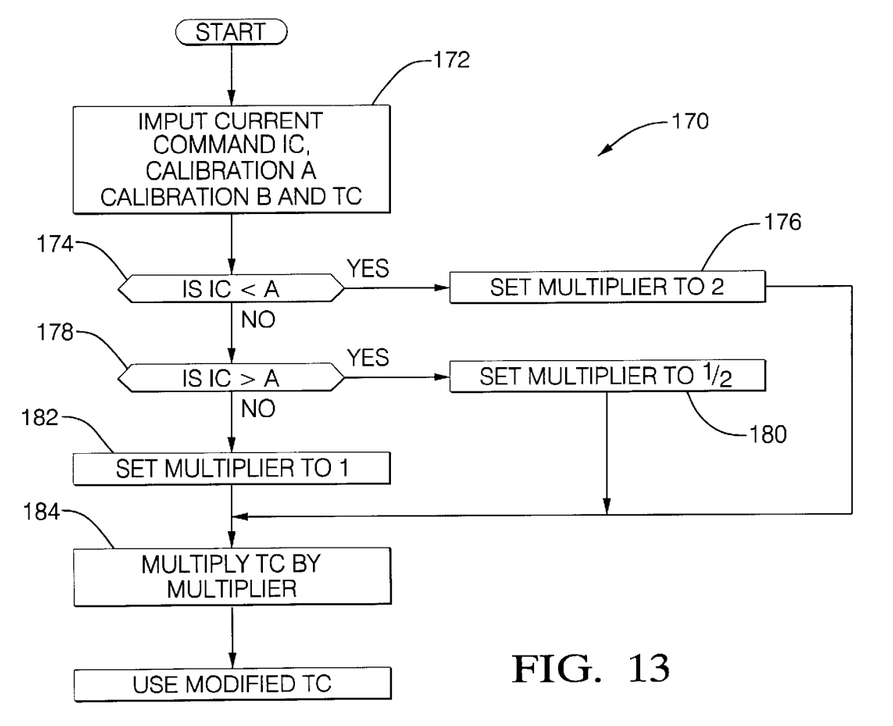
FIG. 13 is a flowchart of a control algorithm for use by the controller of FIG. 2 in an alternative embodiment of the present invention.
Figure 14:
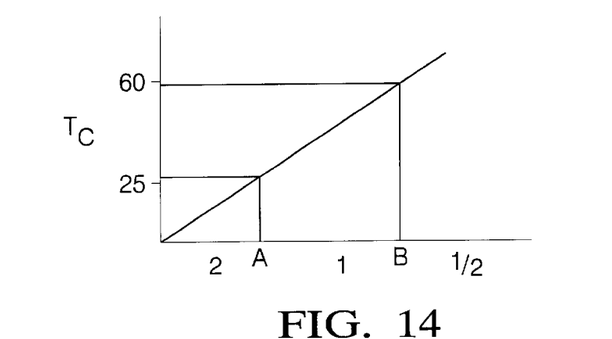
FIG. 14 is a graph illustrating calibration constant as a function of input current command.

As an alternative, and referring now to FIGS. 13 and 14, once the time constant $T_c$ has been determined the current command value $I_c$ is used to rescale the time constant $T_c$. This will allow for more optimal tuning of the time constant allowing for further reduction of commutation noise.

The Tc relationship with motor speed can be optimized at a motor operating current. Then, the additional mapping of Tc with motor current command additionally optimizes Tc at other or currents higher and lower than the previous current.

Here control computer 58 employs a command sequence 170 illustrated by the flowchart in FIG. 13. Command sequence 170 determines a multiplier to be applied to the time constant Tc in order to further reduce any possibility of commutation noise.

Command sequence 170 has a first step 172 wherein the following inputs are received: current command Ic, time constant Tc (calculated by controller 40 using the analysis process as outlined in FIGS. 1–12), a first constant A (constant A represents a value of motor current) and a second constant B (constant B represents a value of motor current higher than that represented by constant A). In an exemplary embodiment, first constant A is 25 amperes and constant B is 60 amperes. (FIG. 14) Of course, it is contemplated that the values of constant A and B can vary. For example, and depending on the type of electric motor being used constants A and B depend upon the network properties of a particular motor.

A first decision node or second step 174 determines whether the input current command Ic is less than or equal to first constant A. If yes, a third step 176 sets the multiplier for the time constant to 2.

If no, a fourth step or decision node 178 determines whether the input current command Ic is greater than second constant B. If yes, a step 180 sets the multiplier to ½. If the input current command is not greater than constant B or within the range defined by constant A and B, the multiplier is set to 1 by a command step 182. Or on the other hand, no further modification of the time constant Tc is necessary.

A final step 184 multiplies the time constant Tc by the appropriate multiplier. The modified time constant Tc is now used in accordance with the embodiment outlined in FIGS. 1–12 in order to reduce the commutation noise of the electric motor.

Figure 15:
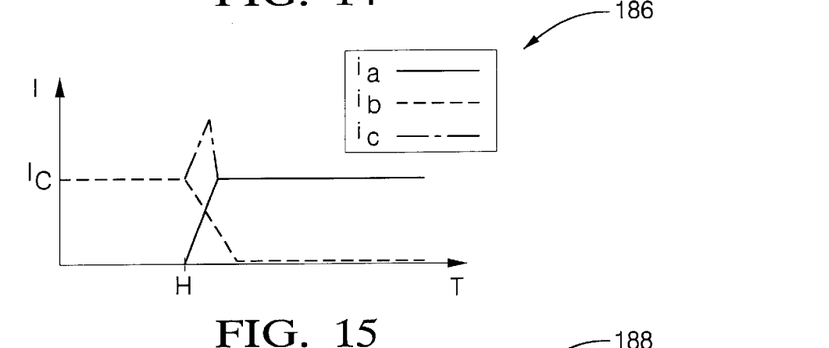
FIG. 15 is a graph illustrating the relationship of individual phase currents when the rate of current change is controlled by the network properties of the machine.
Figures 16, 17:
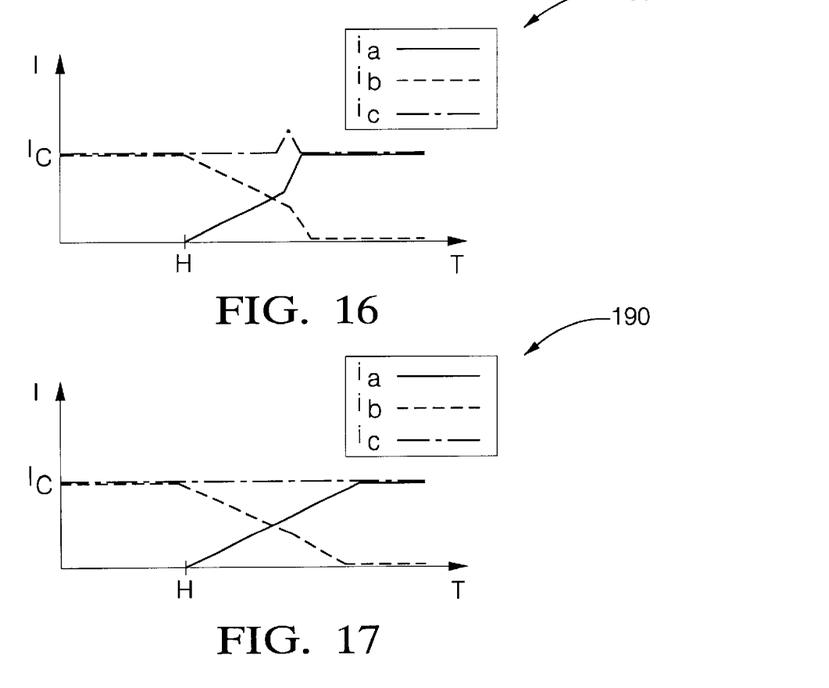
FIG. 16 is a graph illustrating the relationship of the individual phase currents when the rate of the current being deactivated is manipulated by a time constant which is dependent upon the motor speed.
FIG. 17 is a graph illustrating the relationship of the individual phase currents when the rate of the current being deactivated is manipulated by a time constant which is also dependent upon the input current level.

Referring now to FIGS. 15–17, a graphical representation of the relationship of the current command (Ic), and the individual currents of each phase within motor 34. Referring now in particular to FIG. 15 a graph 186 illustrates the relationship between current command Ic and the individual phases during a commutation event where the rate of current change is controlled by the network properties of the machine or motor 34. Here the current in the phase being shut off is represented by the dashed line marked $i_b$ and the current of the phase being activated is represented by the line $i_a$. Since the slope of the current of the phase being activated $(i_a)$ is greater in magnitude than the slope of the current of the phase being deactivated $(i_b)$ there is, accordingly, a resulting imbalance which is represented by the peak indicated by line $i_c$ or the phase current of the motor phase which is remaining on. Therefore, the rising and falling currents have different rates that result in the average motor current having a spike that can cause an audible noise.

Referring now to FIG. 16, a graph 188 illustrates the rate of current change which is being controlled in part by the time constant Tc which varies inversely with the speed of motor 34.

Here the current of the phase being shut off is again being represented by the line ib and the current demand of the phase being activated is represented by the line ia. Here the time constant (dependent solely upon motor speed) is utilized to control the current of the phase being shut off so that there is a significantly lower peak ic in the average current or the phase which remains on. However, it is noted that at lower current demands there is still a peak.

Moreover, and in applications where the electric motor is more susceptible to noise at low currents, due to manufacturing standards, there still may be an audible noise created when operating under lower current commands. (Such as those illustrated in FIG. 16). Accordingly, and as contemplated in accordance with the instant application, the time constant is further manipulated by the command sequence illustrated in FIG. 13.

Referring now in particular to FIG. 17, a graph 190 illustrates the relationship between the current changes where the time constant is also dependent upon the input current level. Once again the phase being deactivated is represented by ib and the phase being activated is represented by ia. Accordingly, and if applicable, the time constant is increased if the input current command is lower than a calibration constant (FIGS. 13–14). As illustrated in graph 190 the resulting slopes of ia and ib are matched such that there is no peak in the current available or the phase which remains on. Accordingly, and using the command sequence outlined in FIG. 13, a larger time constant is used for current commands Ic of lower values.

Figure 18:
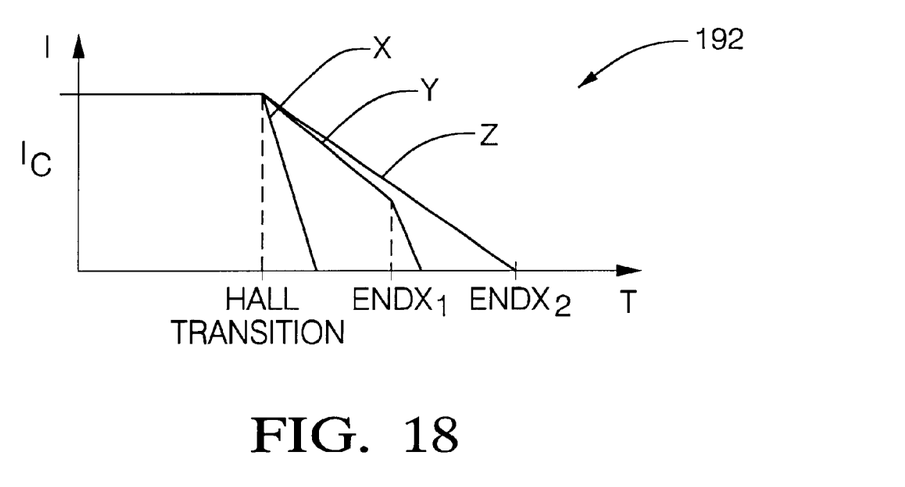
FIG. 18 is a graph comparing the graphs illustrated in FIGS. 15–17.
Figure 19:
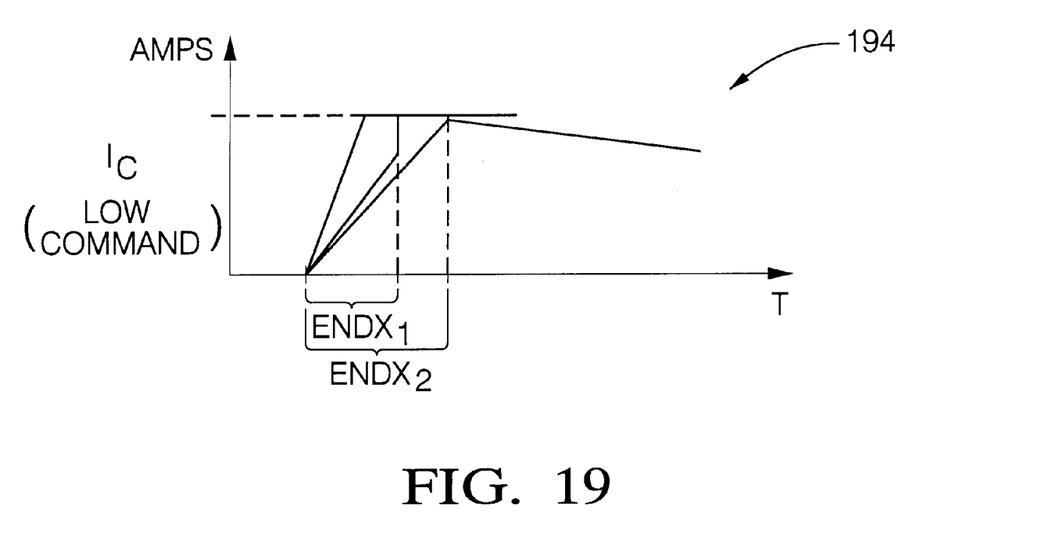
FIG. 19 is a graph comparing the graphs illustrated in FIGS. 15–17.

For example, and referring now to FIGS. 18 and 19, graphs 192 and 194 illustrate the comparison of the rate of changes of the phase currents illustrated in FIGS. 15–17.

Referring now in particular to FIG. 18, a first line X with a slope representing the rate of change of the phase current in an electric motor at commutation. Here the rate of change is only controlled by the network properties of the motor. (FIG. 15) Line Y having a slope representing the rate of change of the phase current in an electric motor operating at a low current wherein the time constant Tc has been determined in accordance with the embodiment outlined in FIGS. 1–12. (FIG. 16) Note that the current decreases slowly in the time interval between the hall sensor transition and ENDX1, but more rapidly after time ENDX1 since the network properties only control the rate of change throughout the remaining transition range of the current.

Accordingly, in using the command sequence outlined in FIG. 13, a larger time constant is used for current commands Ic of lower values. One such example is illustrated by the line Tc wherein the line Z represents the rate of change of the phase current in a motor operating at a lower current. Moreover, and since the time constant Tc is larger the total time interval between initiation of the decreasing modulation at hall sensor event and its termination at ENDX2 is increased, allowing the current to decrease slowly throughout its transition range. (line Z) (FIG. 17)

In accordance with the present invention, and as previously discussed herein, the "zipper noise" reduction depends upon controlling the rate of change of the phase current being deactivated.

Accordingly, command sequence 170 is able to further define the time constant based upon the input current command. It is, of course, contemplated in accordance with the present invention that the number of current ranges defined by constants A and B could be greater. For example, and depending on the intrinsic characteristics of the component parts of the electrical power steering assist mechanism as well as the memory capacity the computer controller, several current ranges can be defined by a plurality of constants A, B, C and D etc.

Moreover, and depending on the number of constants, the number of ranges for which an appropriate multiplier is required will also vary.

It is also contemplated that values other than 2, 1 and ½ can be used as multipliers for command sequence 170.

In addition, and as an alternative, the input current Ic can be continuously reported and inputted into command sequence 170, and accordingly, the multiplier will also vary continuously in accordance with the readings of input current Ic.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for reducing commutation noise in an electric motor having a bridge switching circuit with a first and second group of switches each switch of said first group of switches being connected in series across a source of power with a different switch of said second group of switches, and a junction of each pair of series connected switches being connected to a different phase armature winding of said electric motor, said method comprising:
   a) repeatedly activating a selected switch of said first group of switches and a selected switch of said second group of switches, said selected switch of said second group of switches being non-series connected to said selected switch of said first group;
   b) connecting at least two phase windings in series with said electrical power source in a predetermined commutation pattern to provide torque producing phase currents, said predetermined commutation pattern defining commutation events in which a switch from either one of said groups is deactivated and another switch of the same group is activated and a switch of the other group remains activated, the newly activated switch alternating in consecutive commutation events between said first group and said second group; and
   c) providing overlapping activation of the switch being deactivated with the switch being newly activated and the switch remaining activated during each commutation event, the newly activated switch being pulse width modulated with a motor torque controlling duty cycle and the switch being deactivated being pulse width modulated with pulses initiated synchronously with those of the newly activated switch but with the duty cycle decreasing from the torque controlling duty cycle.

2. The method of claim 1, in which the duty cycle of the switch being deactivated is decreased in an exponential manner.

3. The method of claim 2 in which the time constant of the exponential decrease is varied inversely with motor speed to produce a predetermined minimum duty cycle over a predetermined maximum number of electrical degrees of the motor.

4. The method of claim 3, wherein a current command representing the current status of said motor is inputted into a control algorithm and compared to a first calibration value and if said current command is less than said first calibration value the value of said time constant is increased, if said current command is greater than said first calibration value, said current command is compared to a second calibration value, if said current command is less than said second calibration value the value of said time constant remained unchanged, if said current command is greater than said second calibration value the value of said time constant is decreased.

5. The method of claim 4, wherein said first and second calibration values vary in accordance with the network properties of said motor.

6. The method of claim 1, wherein said motor is operated in a single switching mode and the switch remaining activated is closed continuously during commutation.

7. The method of claim 6, wherein said motor is alternated between the single switching mode and a dual switching mode in response to a signal varying with motor torque.

8. The method of claim 6, wherein said motor is changed between the single switching mode and the dual switching mode in further response to a signal varying with motor speed.

9. The method of claim 7, wherein the switch remaining activated is pulse width modulated synchronously with the switch being newly activated in said dual switching mode.

10. The method of claim 1, wherein said motor is operated in a dual switching mode and the switch remaining activated is pulse width modulated synchronously with the switch being newly activated at the motor torque controlling duty cycle.

11. The method of claim 10, wherein s aid motor is alternated between a single switching mode and the dual switching mode in response to a signal varying with motor torque.

12. The method of claim 11, wherein said motor is changed between the single switching mode and the dual switching mode in further response to a signal varying with motor speed.

13. The method of claim 12, wherein the switch remaining activated during single switching mode is closed continuously during activation.

14. A method for reducing commutation noise in a brushless DC motor having a plurality of switches coupled to a power source and a plurality of phase windings, said switches being activated and deactivated in a predetermined commutation pattern to provide torque producing phase currents in the windings of said motor, said method comprising:

a) determining a time constant for manipulating the rate of deactivation of said switches;

b) comparing a current command of said motor with a first value, said first value corresponding to a value of motor current, if said current command is less than said first value the value of said time constant is increased, if said current command is greater than said first value said current command is compared to a second value, said second value corresponding to a second value of motor current, said second value being greater than said first value, if said current command is less than said second value the value of said time constant remains unchanged, if said current command is greater than said second value the value of said time constant is decreased; and c) using said time constant after said comparing step to manipulate the rate of deactivation of said switches.

15. The method as in claim 14, wherein said first and second values are replaced by a plurality of values corresponding to a plurality of current values and said current command is compared to said plurality of values and the value of said time constant is either increased or decreased after the comparison of said current command to said plurality of values.

16. The method as in claim 14, wherein said time constant varies continuously with said current command.

17. The method as in claim 15, wherein said time constant varies continuously with said current command.

18. A method for optimizing performance in an electric motor having a bridge switching circuit with a first and second group of switches each switch of said first group of switches being connected in series across a source of power with a different switch of said second group of switches, and a junction of each pair of series connected switches being connected to a different phase armature winding of said electric motor, said method comprising:

a) repeatedly activating a selected switch of said first group of switches and a selected switch of said second group of switches, said selected switch of said second group of switches being non-series connected to said selected switch of said first group;

b) connecting at least two phase windings in series with said electrical power source in a predetermined commutation pattern to provide torque producing phase currents, said predetermined commutation pattern defining commutation events in which a switch from either one of said groups is deactivated and another switch of the same group is activated and a switch of the other group remains activated, the newly activated switch alternating in consecutive commutation events between said first group and said second group; and c) alternating between a single switching mode and a dual switching mode in response to a signal varying with motor torque.

19. The method as in claim 18, wherein said signal varies with motor torque and motor speed.

20. The method as in claim 14, wherein said time constant is derived as a function of said motor speed.

21. The method as in claim 14, wherein said first value is 25 amperes and said second value is 60 amperes.

22. The method as in claim 14, wherein said time constant is also dependent upon the input current level.

23. A method for reducing commutation noise in a brushless DC motor having a plurality of switches coupled to a power source and a plurality of phase windings, said switches being activated and deactivated in a predetermined commutation pattern to provide torque producing phase currents in the windings of said motor, said method comprising:

determining a time constant for manipulating the rate of deactivation of said switches;

comparing a current command of said motor with a first value, said first value corresponding to a value of motor current, if said current command is less than said first value the value of said time constant is doubled, if said current command is greater than said first value said current command is compared to a second value, said second value corresponding to a second value of motor current, said second value being greater than said first value, if said current command is less than said second value the value of said time constant is multiplied by one or remains unchanged, if said current command is greater than said second value the value of said time constant is decreased by half; and using said time constant after said comparing step to manipulate the rate of deactivation of said switches.

24. The method of claim 2 in which a time constant is derived, said time constant corresponding to the exponential decrease of the switch being deactivated.

25. The method of claim 24 wherein the exponential decrease is varied inversely with motor speed to produce a predetermined minimum duty cycle over a predetermined maximum number of electrical degrees of the motor.

26. The method of claim 24, wherein a current command representing the current status of said motor is inputted into a control algorithm and compared to a first calibration value and if said current command is less than said first calibration value the value of said time constant is increased, if said current command is greater than said first calibration value, said current command is compared to a second calibration value, if said current command is less than said second calibration value the value of said time constant remained unchanged, if said current command is greater than said second calibration value the value of said time constant is decreased.

* * * * *